(12) United States Patent
Morita

(10) Patent No.: US 7,532,367 B2
(45) Date of Patent: May 12, 2009

(54) ELECTRONIC DEVICE AND STORAGE MEDIUM WHICH STORES A CONTROL PROGRAM

(75) Inventor: Yoshio Morita, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 589 days.

(21) Appl. No.: 11/162,946

(22) Filed: Sep. 28, 2005

(65) Prior Publication Data

US 2007/0070433 A1    Mar. 29, 2007

(51) Int. Cl.
*H04N 1/00* (2006.01)
(52) U.S. Cl. ............... 358/400; 358/401; 358/442; 358/413
(58) Field of Classification Search ............ 358/400, 358/413, 442, 401
See application file for complete search history.

(56) References Cited

FOREIGN PATENT DOCUMENTS

| CN | 1111595 A | 11/1995 |
|---|---|---|
| JP | H06-276312 A | 9/1994 |
| JP | 2004-030144 A | 1/2004 |
| JP | 2004030144 * | 1/2004 |
| JP | 2004-48606 A | 2/2004 |
| JP | 2004-147135 | 5/2004 |

* cited by examiner

*Primary Examiner*—Twyler L. Haskins
*Assistant Examiner*—Michael Burleson
(74) *Attorney, Agent, or Firm*—Shinjyu Global IP

(57) ABSTRACT

An electronic device is disclosed in which parameters or functions thereof can be executed with fewer key operations. An electronic device such as a facsimile device has a display unit that displays a plurality of keys that can be respectively used to specify and select the parameters or functions thereof, and will determine whether the length of time that each of the plurality of keys is pushed is long or short. If a key is pushed for a short period of time, that key will simply be selected, and if a key is pushed for a long period of time, that key will be selected and facsimile transmission will automatically begin.

5 Claims, 6 Drawing Sheets

ELECTRONIC DEVICE AND STORAGE MEDIUM WHICH STORES A CONTROL PROGRAM

BACKGROUND OF THE INVENTION

1. Field of the Invention

The present invention relates to electronic devices, and more particularly to electronic devices such as an image forming device, a facsimile device, and the like. In addition, the present invention also relates to a storage medium that stores a control program for these types of electronic devices.

2. Background Information

A plurality of keys are provided on a conventional facsimile device (an example of an electronic device) in order to select the recipient(s) of a facsimile. It is well known that the mode of a facsimile device can be changed in accordance with the amount of time that a key thereon is pushed (see, for example, paragraph 0010 of Japanese published patent application 2004-147135). The aforementioned conventional facsimile device includes a touch panel type of operation unit like that shown in FIG. 6. When a facsimile is to be transmitted to a plurality of recipients, a sender will, for example, select recipients B, C, and D (circles with dashed lines in the figure), and begin transmission by pushing a transmit key (such as a start key) not shown in the figure. Thus, with electronic devices such as a facsimile device, at least two key operations will be needed in order to select one or more recipients and begin facsimile transmission.

It is therefore an object of the present invention to provide an electronic device that allows a user to specify the parameters or functions thereof with fewer key operations. Another object of the present invention is to provide a storage medium that stores a control program that is executed by this type of electronic device.

SUMMARY OF THE INVENTION

An electronic device according to the present invention includes display means, push time determination means, and control means. The display means displays a plurality of keys that are used to select the parameters or functions of the electronic device. The push time determination means will determine whether each of the plurality of keys has been pushed for a period of time that is less than a predetermined period of time, or for a period of time that is equal to or greater than a predetermined period of time. The control means determines that the keys determined to have been pushed by the push time determination means are selected, and executes parameters or functions associated with the plurality of keys. When the push time determination means determines that one or more of the plurality of keys have been pushed for a time period that is less than the predetermined period of time, the control means will determine that the one or more keys have been selected, and when the push time determination means determines that one of the plurality of keys has been pushed for a time period that is equal to or greater than the predetermined time period, the control means will determine that the one key has been selected, and will execute all parameters or functions associated the selected keys.

Preferably, when one of the plurality of keys is consecutively pushed, the control means will determine that the selection of that key has been cancelled.

Note that the electronic device may be a facsimile device, and the plurality of keys thereon may represent a plurality of facsimile recipients. In addition, the electronic device may be a copy machine, and the plurality of keys thereon may be used to set the copy parameters employed during copying.

Furthermore, a storage medium stores a control program according to the present invention. The storage medium stores a control program executed by an electronic device that includes a display unit that displays a plurality of keys used to select parameters or functions, the control program causing the electronic device to execute the steps of:

(a) determining whether each of the plurality of keys has been pushed for a period of time that is less than a predetermined period of time, or for a period of time that is equal to or greater than the predetermined period of time;

(b) determining that the keys determined to have been pushed in step (a) are selected; and (c) executing parameters or functions associated with the keys selected in step (b).

If it is determined in step (a) that one or more of the plurality of keys have been pushed for a time period that is less than the predetermined period of time, it will be determined in step (b) that the one or more keys have been selected, and if it is determined in step (a) that one of the plurality of keys has been pushed for a time period that is equal to or greater than the predetermined time period, it will be determined in step (b) that the one key has been selected, and all parameters or functions associated the selected keys will be executed in step (c).

According to the present invention, in response to the amount of time that each of the plurality of keys that select parameters or functions has been pushed, it will be determined whether those keys have been selected, or whether those keys have been selected and the execution of the selected function(s) and the like have been ordered. If a key has been pushed for a period of time that is equal to or greater than the predetermined amount of time, that key will be selected, and all functions and the like selected up until that point will be executed. Thus, it will not be necessary to operate keys other than the keys selected to order the execution of the parameters or functions. Therefore, the execution of parameters or functions can be ordered with fewer key operations.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Preferred embodiments of the present invention will be described below with reference to the figures.

Figure 1:
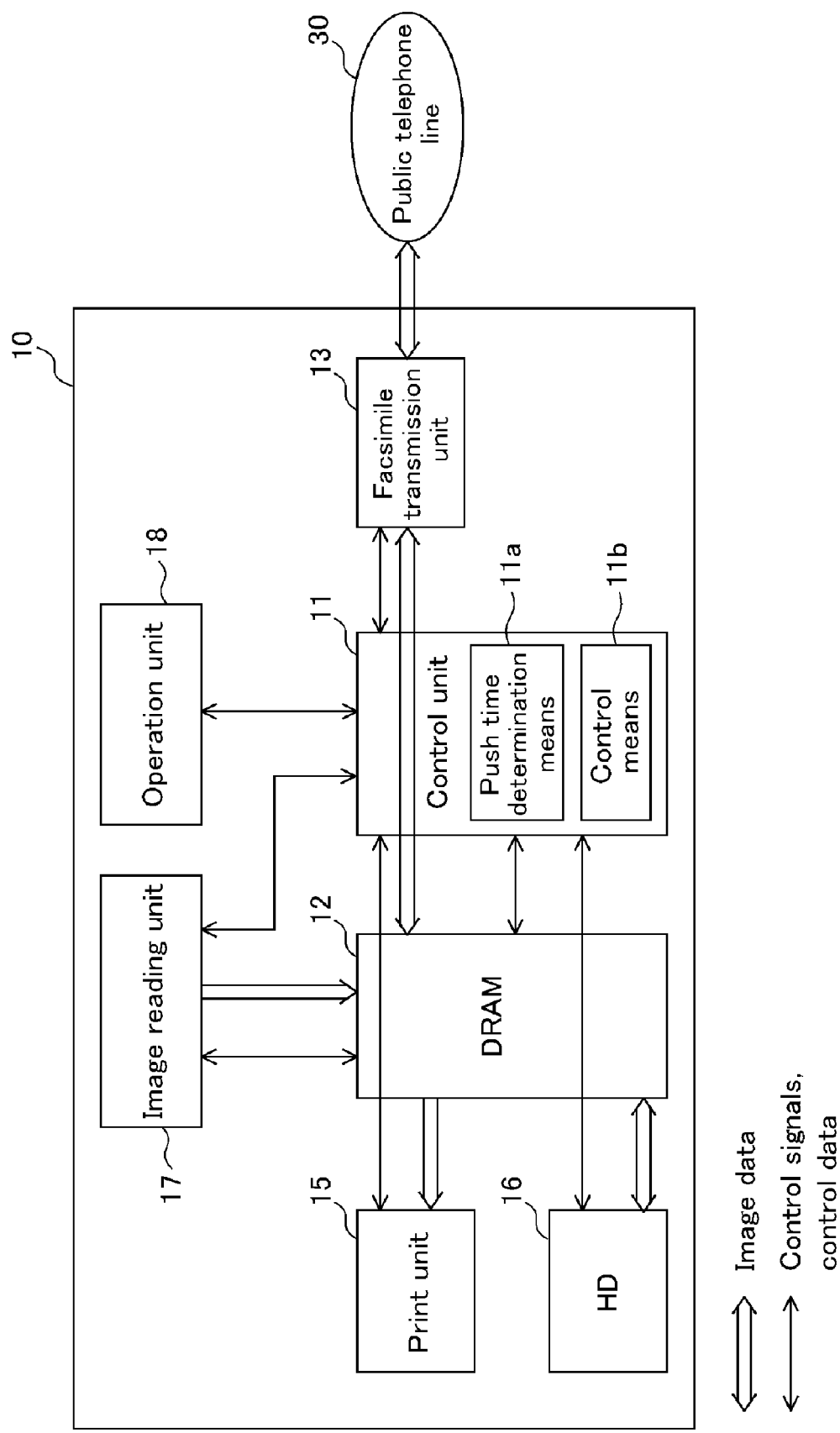
FIG. 1 is a block diagram showing the configuration of a facsimile device.

FIG. 1 is a block diagram that shows the configuration of a facsimile device 10 (an example of an electronic device) according to one embodiment of the present invention. As shown in FIG. 1, the facsimile device 10 includes a control unit 11 that controls the entire facsimile device 10, a DRAM 12, a facsimile transmission unit 13, a print unit 15, a hard disk 16 that stores data, an image reading unit 17, and an operation unit 18. The control unit 11 functions as a control means 11b and a push time determination means 11a.

The image reading unit 17 includes a photoelectric transducer (not shown in the figures) that is composed of, for example, one or more charge coupled devices (CCD).

Figure 2:
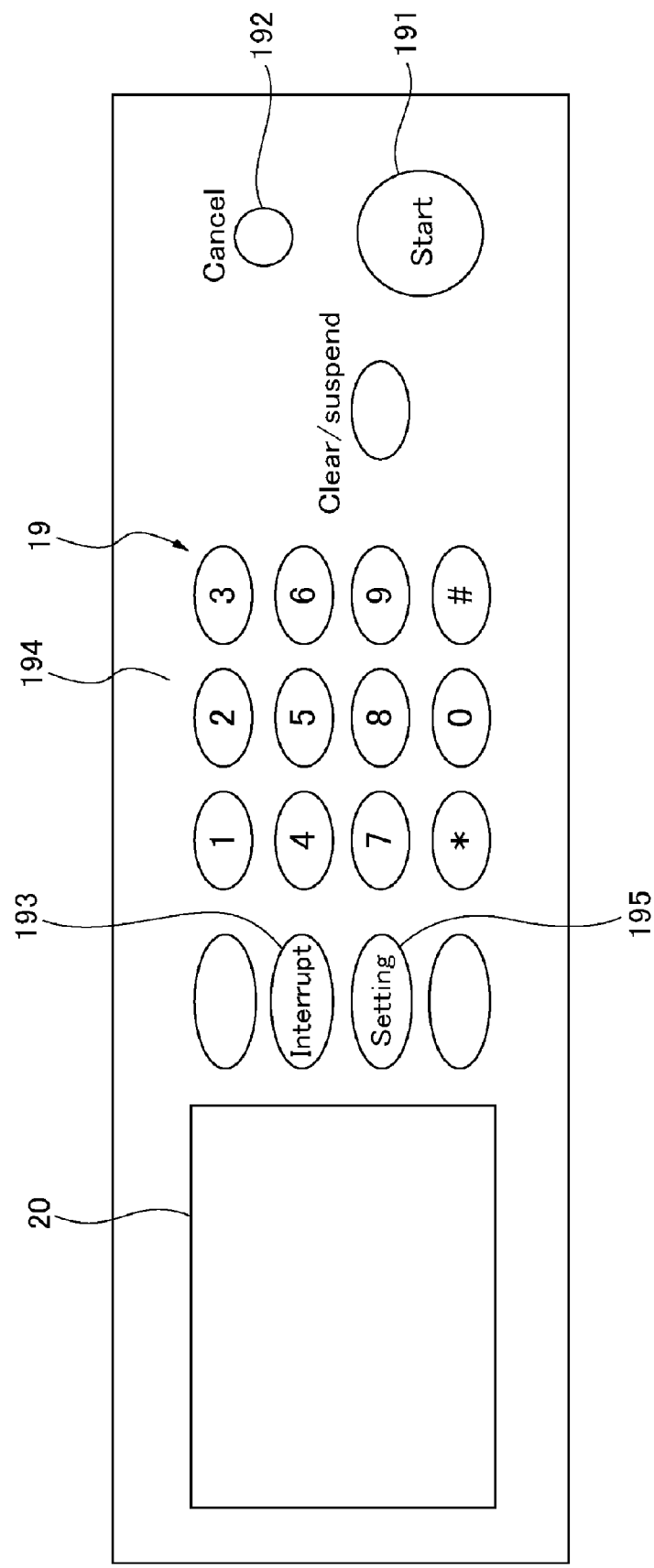
FIG. 2 is a diagram showing an operation unit of the facsimile device of FIG. 1.

FIG. 2 shows the operation unit 18 in greater detail. As shown in FIG. 2, the operation unit 18 includes an input unit 19 and a display unit 20. The input unit 19 includes a start key 191 that is used to start facsimile transmission, a cancel key 192 that is used to cancel all processes, an interrupt key 193 that is used to execute or cancel an interrupt command, a 10-key 194 that is used to input the facsimile number of a facsimile recipient, a setting key 195 that is used to set various data, as well as other keys used in various processes.

The display unit 20 is composed of a liquid crystal panel, and can display data from the facsimile device 10 to a user. This liquid crystal panel is a touch panel, and as noted below, displays a plurality of recipients.

The control unit 11 compresses and encrypts data obtained from the image reading unit 17 and data obtained from the facsimile transmission unit 13 and writes this data to the DRAM 12, reads out the data written to the DRAM 12, and expands, decrypts, and outputs this data. In addition, the control unit 11 controls transmissions performed by the facsimile transmission unit 13, controls the printing performed by the print unit 15, controls the image reading performed by the image reading unit 17, controls the input of data from the input unit 19 of the operation unit 18, and controls the display of data on the display unit 20 of the control unit 18.

Note that in FIG. 1, the thick arrow lines indicate the flow of image data, and the thin arrow lines indicate the flow of control signals or control data.

Figure 3:
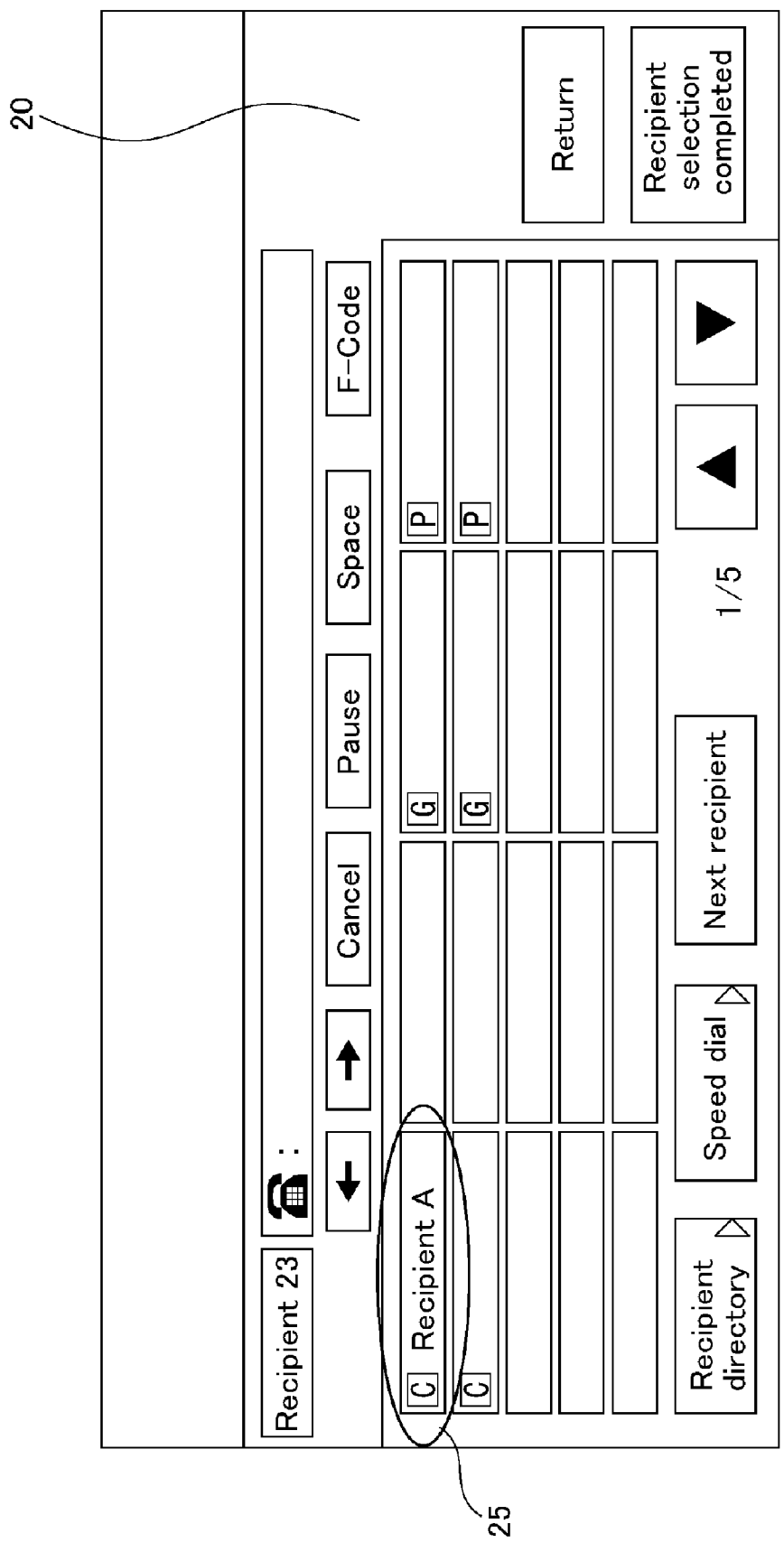
FIG. 3 is a diagram showing a sample display of a display unit of the facsimile device of FIG. 1.
Figure 4:
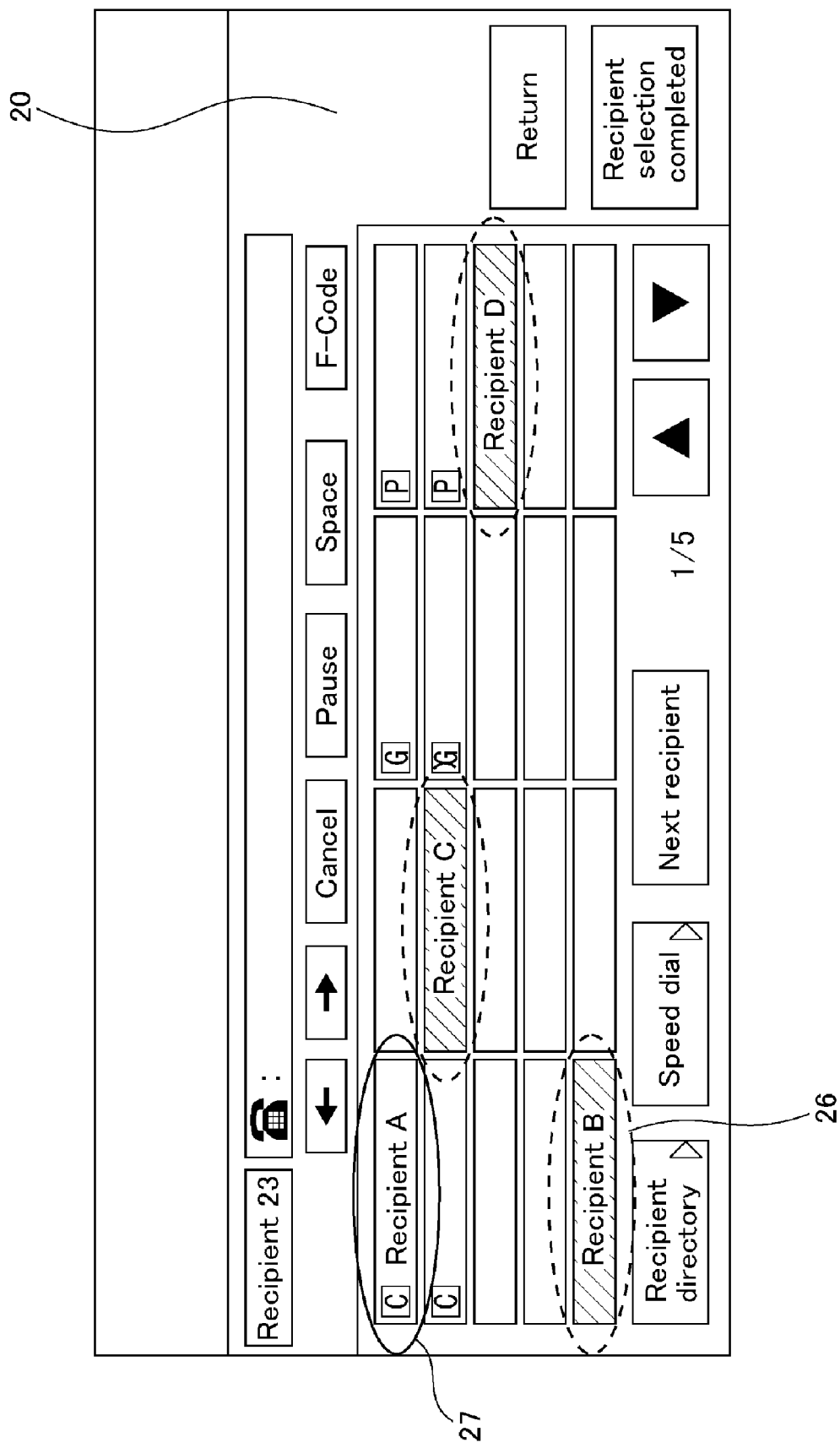
FIG. 4 is a diagram showing another sample display of the display unit of the facsimile device of FIG. 1.

Next, the processes performed in the facsimile device 10 during facsimile transmission will be described. FIGS. 3 and 4 show examples of the facsimile recipients displayed on the display unit 20, and FIG. 5 is a flowchart that shows the recipient selection process.

Figure 5:
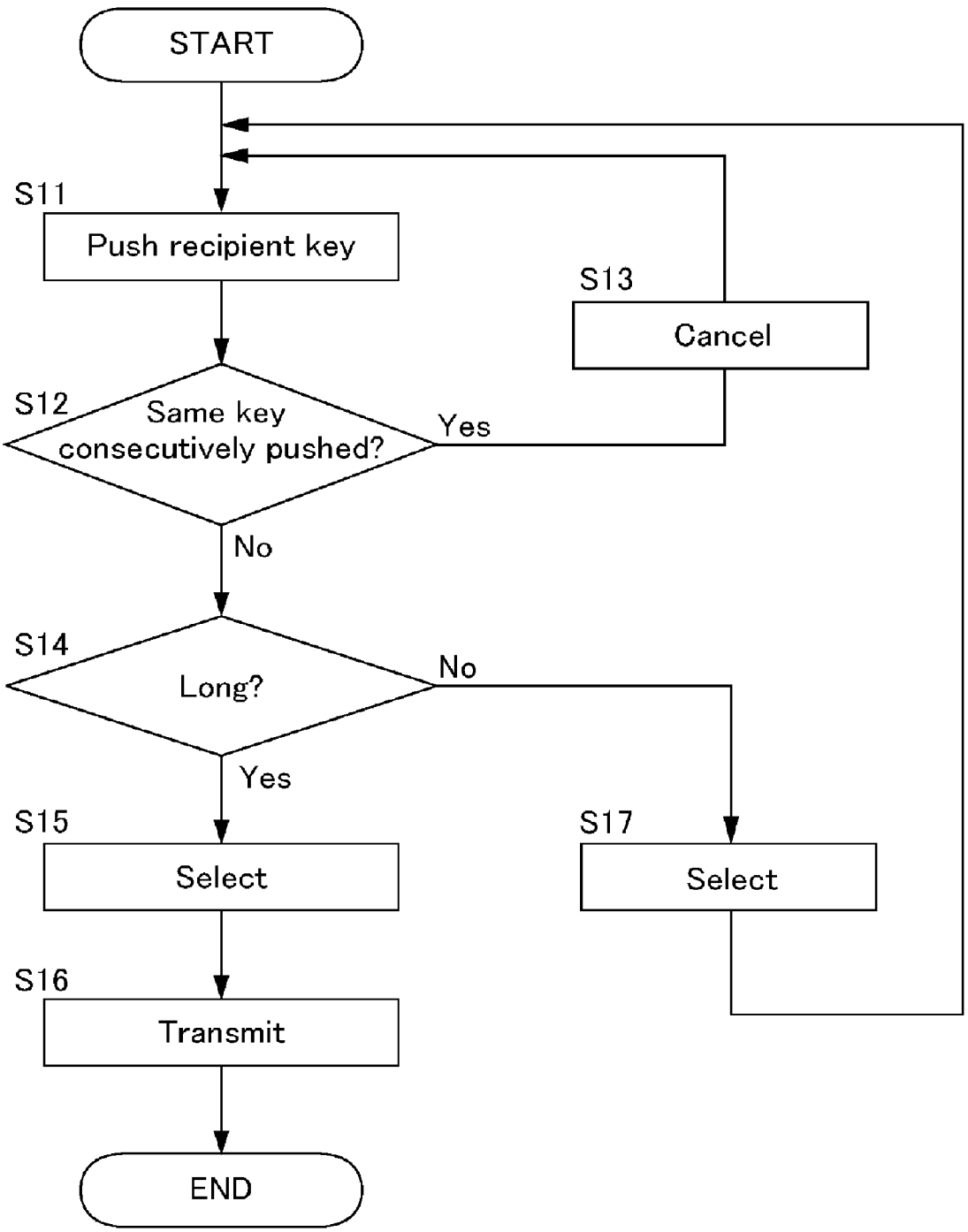
FIG. 5 is a flowchart showing the operation of the facsimile device of FIG. 1.
Figure 6:
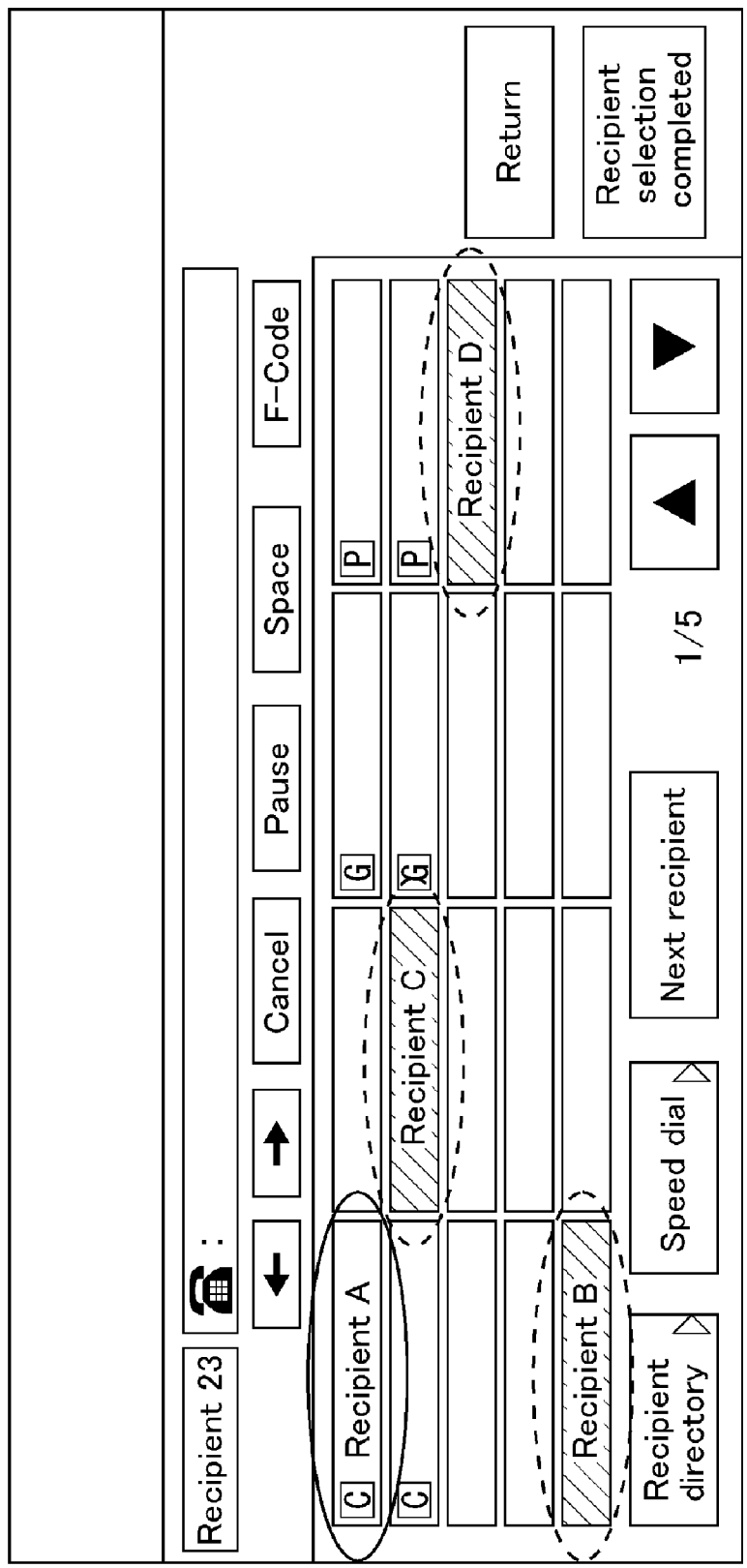
FIG. 6 is a diagram showing a sample display of a display unit of a conventional facsimile device.

As shown in FIGS. 3 and 5, when a user is to transmit a facsimile to recipient A, he or she will select and push the key that represents recipient A (shown with the solid line 25 in FIG. 3) (Step S11). If the key that represents recipient A is not consecutively pushed (S12 is NO), it will be determined whether or not this key has been pushed for a long period of time (e.g., from one to two seconds, or for longer than a predetermined period of time) (S13). If this key has been pushed for a long period of time (S13 is YES), recipient A will be selected (S16) and transmission will begin (S17). In other words, both the selection of the recipient and the transmission of the facsimile will be performed with one key operation.

Next, as shown in FIGS. 4 and 5, transmission to a plurality of recipients will be described. Here, a situation will be described in which a facsimile will be transmitted to recipients A-D in four different locations. In this situation, recipients B, C and D will be selected first (indicated by the dashed lines 26 in FIG. 4), and then recipient A will be selected (indicated by the solid line A in FIG. 4). A user will push each key corresponding to recipients B-D for a short period of time (e.g., less than one second, or less than a predetermined period of time). For example, when the key that represents recipient B is pushed (S11), only recipient selection will be performed because that key has been pushed for a short period of time (S13 is NO, S15). This process is the same for recipients C and D.

Then, the key representing recipient A will be pushed for a long period of time (S11, S13 is YES). When this occurs, recipient A will be selected (S16), and transmission to all selected recipients A-D will begin (S17). Note that this sequence is simply an example, and the same process will be performed if the final key in any sequence of keys is pushed for a long period of time.

In addition, in the event that a user has pressed a key by mistake, that key can be pressed again (S12 is YES) to thereby cancel that key operation (S13).

As shown above, the number of keys to be pushed in order to select a facsimile recipient and transmit a facsimile will be the same as the number of recipients, even if the facsimile is to be transmitted to a plurality of recipients, and there will be no need to push a separate start key in order to begin facsimile transmission.

Thus, with this facsimile device, a transmission command can be performed by means of a simple key operation.

Note that in the aforementioned embodiment, a facsimile device was used to illustrate the present invention. However, the present invention may also be applied to a copy machine. In this situation, keys used to select copy parameters, such as the number of copies, the magnification, and the like, are displayed on the display unit, and when any one of those keys are pushed for a long period of time, a copy operation will begin in accordance with the selected parameters.

In addition, instead of determining whether each key has been pushed for a period of time that is less than a predetermined period of time or pushed for a period of time that is equal to or greater than a predetermined period of time, the push time determination means may, as a determination standard, determine whether each key has been pushed for a period of time that is equal to or less than a predetermined period of time or pushed for a period of time that is longer than a predetermined period of time. Furthermore, the present invention may also be applied to a network scanner, or other types of electronic devices. The same effects as those described in the aforementioned embodiment can be obtained.

With other electronic devices, the keys may be selection keys that select parameters or functions that are characteristic of those devices. For example, with a radio cassette recorder that includes a CD drive, these keys may be those used to switch the CD drive, the radio, and the cassette on and off, change the sound quality, or the like.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An electronic device, comprising:
   a display unit configured to display a plurality of keys that are used to select parameters or functions of the electronic device;
   a push time determination unit configured to determine whether each of the plurality of keys has been pushed for a period of time that is less than a predetermined period of time or for a period of time that is equal to or greater than a predetermined period of time; and a control unit operatively connected to the push time determination unit and configured to determine that the keys determined to have been pushed are selected and executes parameters or functions associated with the plurality of keys, wherein when the push time determination unit determines that one or more of the plurality of keys have been pushed for a time period that is less than the predetermined period of time and one of the plurality of keys have been pushed for a time period equal to or greater than the predetermined time period, the control unit will determine that multiple keys have been selected and all parameters or functions associated with those selected keys will be executed, and when the push time determination unit determines that only one of the plurality of keys has been pushed for a time period that is equal to or greater than the predetermined time period, the control unit will determine that the one key has been selected and will execute all parameters or functions associated with that selected key.

2. The electronic device according to claim 1, wherein when one of the plurality of keys is pressed again, the control unit will determine that the selection of that key has been cancelled.

3. The electronic device according to claim 1, wherein the electronic device is a facsimile device, and each of the plurality of keys thereon represent a facsimile recipient.

4. The electronic device according to claim 1, wherein the electronic device is a copy machine, and the plurality of keys thereon are used to set copy parameters employed during copying.

5. A storage medium that stores a control program executed by an electronic device that includes a display unit that displays a plurality of keys used to select parameters or functions, the control program causing the electronic device to execute processing steps comprising:

(a) determining whether each of the plurality of keys has been pushed for a period of time that is less than a predetermined period of time or for a period of time that is equal to or greater than the predetermined period of time;

(b) determining that the keys determined to have been pushed in step (a) are selected; and (c) executing parameters or functions associated with the keys selected in step (b), wherein if it is determined in step (a) that one or more of the plurality of keys have been pushed for a time period that is less than the predetermined period of time and one of the plurality of keys have been pushed for a time period equal to or greater than the predetermined time period, it will be determined in step (b) that the multiple keys have been selected and all parameters or functions associated with those selected keys will be executed, and if it is determined in step (a) that only one of the plurality of keys has been pushed for a time period that is equal to or greater than the predetermined time period, it will be determined in step (b) that the one key has been selected, and all parameters or functions associated with that selected key will be executed in step (c).

* * * * *